United States Patent [19]

Schmidt et al.

[11] 3,964,661

[45] June 22, 1976

[54] APPARATUS FOR ATTACHING PRONGED AND MATING ELEMENTS TO ARTICLES

[75] Inventors: Erich A. Schmidt; Volker E. Schmidt, both of Lexington, Ky.

[73] Assignee: Textron, Inc., Providence, R.I.

[22] Filed: July 18, 1975

[21] Appl. No.: 597,076

Related U.S. Application Data

[63] Continuation-in-part of Ser. No. 509,629, Oct. 23, 1974, abandoned.

[52] U.S. Cl. ................................ 227/18; 227/119; 227/156
[51] Int. Cl.² .......................................... A41H 37/10
[58] Field of Search ............... 227/15, 18, 110, 119, 227/149, 156

[56] References Cited
UNITED STATES PATENTS

| | | |
|---|---|---|
| 1,944,510 | 1/1934 | Hayden............................ 227/119 X |
| 2,377,263 | 5/1945 | Peterson ............................... 227/18 |
| 2,561,108 | 7/1951 | Gerber................................... 227/82 |
| 3,750,925 | 8/1973 | Schmidt et al........................ 227/18 |
| 3,815,805 | 6/1974 | Beneteau ............................ 227/119 |

*Primary Examiner*—Granville Y. Custer, Jr.

[57] ABSTRACT

An apparatus for attaching fastener elements and the like to articles includes an indicator extending downward from a slide bar which advances one of a pair of mating elements to an upper station. The indicator points out the position on an article where the fastening elements will be secured to the article and is automatically retracted when the slide bar is retracted. Additionally, detent members are provided on resilient guide bars for holding elements in an intermediate position along a slide path, and a ram is provided with vertical extensions to maintain orientation of a fastener element.

12 Claims, 9 Drawing Figures

3,964,661

APPARATUS FOR ATTACHING PRONGED AND MATING ELEMENTS TO ARTICLES

CROSS-REFERENCE TO RELATED APPLICATION

This application is a continuation-in-part of our prior U.S. Patent Application Ser. No. 509,629 filed Oct. 23, 1974, now abandoned, and which is hereby incorporated herein by reference.

BACKGROUND OF THE INVENTION

1. Field of the Invention

This invention relates to apparatus for attaching two component elements, such as buttons, snaps and the like, to articles. One of the elements has one or more deformable prongs for securing the one element through the article to the other element.

2. Description of the Prior Art

The prior art, as exemplified in U.S. Pat. Nos. 3,420,427, 3,554,426, 3,612,381, 3,632,033, 3,750,925, 3,803,698 and 3,815,805, contains a number of apparatus for attaching two component elements to articles such as garments. However, in such prior art apparatus it is difficult to determine the exact location where the element will be fastened to an article positioned in the apparatus. Further, prior art apparatus was constructed with a relatively short horizontal throat or opening for receiving the article; such short opening preventing the attachment of the elements to a position spaced a relatively long distance from the edge of an article. Still further, where one of the elements to be attached to an article was dome-shaped, rams in the prior art apparatus for driving the dome-shaped element allowed misalignment as well as the disorientation of the dome-shaped element relative to the other element during movement of the rams to disengage the dome-shaped elements from resilient gripping members.

The prior art also contains diverse indicator devices, for example as disclosed in U.S. Pat. Nos. 3,448,280 and 3,728,027; such indicator devices being either unadaptable for employment in two component element attaching apparatus or being deficient in pointing out the precise location of attachment.

SUMMARY OF THE INVENTION

The invention is summarized in that an apparatus for attaching first and second mating elements to articles wherein one of the first and second elements has a deformable prong extending therefrom for securing the one element through the article to the other of the first and second elements, the apparatus including a lower station for supporting a first element, an upper station vertically aligned with the lower station and spaced above the lower station for supporting a second element, ram means for forcing the first and second elements at the lower and upper stations toward each other, a first hopper and feeding means for containing a plurality of the first elements and for feeding first elements sequentially to the lower station, means forming a slide path extending horizontally to the upper station, a second hopper and feeding means for containing a plurality of second elements and for feeding second elements sequentially to a point in the slide path spaced from the upper station, a slide bar mounted for sliding movement in the slide path, means for operating the ram means and the slide bar to assemble first and second elements on an article between the lower and upper stations and to advance the slide bar after operation of the ram means to push a second element down the slide path to the upper station, an indicator including means mounted on the slide bar for movement therewith, and said indicator means being in vertical alignment with the upper and lower stations when the slide bar is advanced.

An object of the invention is to construct a fastener attaching apparatus which has an indicator for precisely locating the position of attachment of the fastener.

Another object of the invention is to provide a fastener attaching apparatus which can attach fastener elements to an article at positions spaced by a relatively longer distance from an edge thereof than has heretofore been possible.

It is also an object of the invention to provide an improved ram for fastener attaching apparatus wherein fastener elements are maintained in alignment and orientation.

An advantage of the present invention is that an indicator means is mounted on a slide bar in alignment between upper and lower stations when the slide bar is advanced such that the indicator means is removed automatically from between ram facilities at the first and second stations when the slide bar is retracted during the initiation of an attaching cycle of the apparatus.

Other objects and advantages of the invention will be apparent from the following description of the preferred embodiment taken in conjection with the accompanying drawings.

DESCRIPTION OF THE PREFERRED EMBODIMENT

Figure 1:
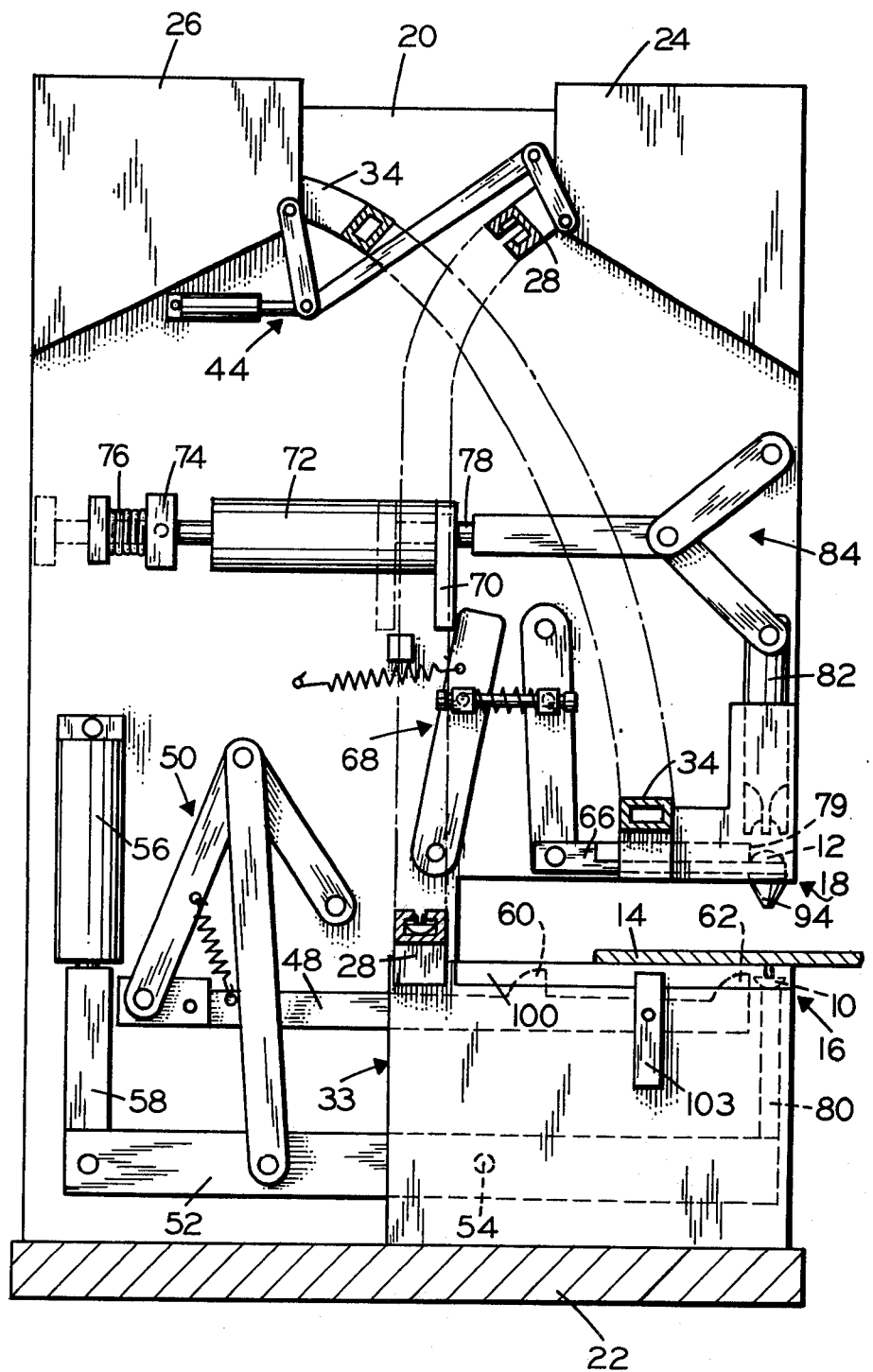
FIG. 1 is a side elevation view of an apparatus for attaching elements to an article in accordance with the invention.
Figure 2:
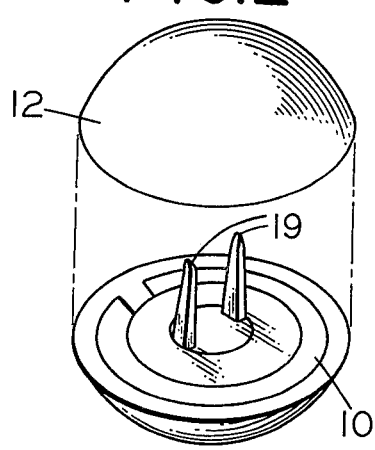
FIG. 2 is a perspective view of one type of pronged and mating fastening elements which can be attached to an article by the apparatus of FIG. 1.
Figure 9:
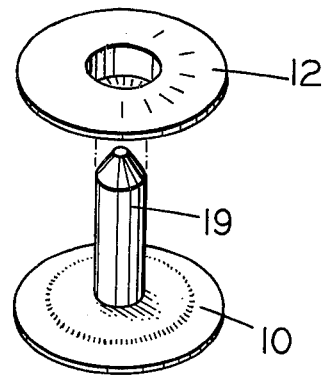
FIG. 9 is a perspective view of another type of pronged and mating fastening elements which can be attached to an article by the apparatus of FIG. 1.

As illustrated in FIG. 1 the invention is embodied in an apparatus for attaching mating elements, such as fastening or decorative elements 10 and 12, to an article 14 positioned between a lower station indicated generally at 16 and an upper station indicated generally at 18. As shown in FIG. 2, the elements 10 and 12 may be the type having flat faces; the element 12 having a dome-shaped head, and the element 10 having a pair of prongs 19 extending therefrom perpendicular to its flat face. Or the elements 10 and 12 may be of various other types such as that shown in FIG. 9 wherein a single deformable prong 19 extends from a slightly conical face of the element 10, and the element 12 is shaped like an inverted hat with a crown portion for being deformed inwardly over the prong 19 and with a brim portion for engaging the article. The prongs 19 of these types of elements are designed to be deformed during insertion into the element 12 to secure the elements 10 and 12 together.

The apparatus of FIG. 1 has a plate-like support 20 vertically mounted upon a table top 22. Hoppers 24 and 26 are mounted on the upper end of the support 20 for containing respective pluralities of the elements 10 and 12. A chute 28 extends between an outlet of the hopper 24 and a rear end point 30, FIG. 4, of a slide path indicated generally at 32 extending horizontally forward to the lower station 16 in a lower assembly indicated generally at 33 mounted on the support 20. A chute 34 extends from an outlet of the hopper 26 to a rear end point 36, FIG. 3, of a slide path 38 formed in an upper assembly indicated generally at 40 mounted on the support 20. The slide path 38 extends from its rear end point 36 to the upper station 18. Suitable means, indicated generally at 44, are mounted on the support 20 for lifting elements 10 and 12 having predetermined orientations within the hoppers 24 and 26 and discharging the elements 10 and 12 into the respective chutes 28 and 34 for being fed by gravity to the respective rear end points 30 and 36 of the slide paths 32 and 38.

A slide bar 48 is slidably mounted within the lower assembly 33 and is connected by a lever arrangement indicated generally at 50 to a lever 52 pivoted at 54 for reciprocating the slide bar 48 when the lever 52 is pivoted. An air cylinder 56 is mounted on the support 20 and has piston rod means 58 for engaging the lever 52 to pivot the lever 52. The slide bar 48 has projections or pushers 60 and 62 extending into the slide path 32 for advancing the elements 10 along the slide path 32.

A slide bar 66 is slidably mounted within the slide path 38 and is connected to a spring biased lever mechanism indicated generally at 68 which is adapted for being engaged and moved by a member 70 mounted on an air cylinder 72 which is slidably supported on a block 74 pivotally secured to the support 20. A spring 76 biases the cylinder 72 against the block 74 such that during a portion of the movement of the piston rod 78 from the air cylinder adjacent the fully retracted position of the piston rod 78, the member 70 operates the lever mechanism 68 to advance and retract the slide bar 66. The forward end 79 of the slide bar 66 is adapted to push an element 12 from the rear point 36 to the station 18 when the slide bar 66 is advanced.

A lower ram 80 extends between the lever 52 and the station 16 for vertically lifting an article 10 from the station 16. An upper ram assembly 82 is attached to a lever mechanism indicated generally at 84 which is secured to the piston rod 78 for raising and lowering the ram assembly 82 during the motion of the piston rod 78 adjacent the most advanced position of the piston rod 78 to raise and lower the ram assembly 82.

Inasmuch as suitable discharging and orienting means 44, lever arrangements 50, 68 and 84, hoppers 24 and 26, rams 80, air cylinders 56 and 72 are well known in the art by being either described in the prior art or having been utilized on commercially-available fastener attaching machines, they are not described in further detail herein. Additionally, suitable control means, such as a treadle air valve or the like, for operating the air cylinders 56 and 72 and the discharging means 44 are also well known in the prior art.

Figure 3:
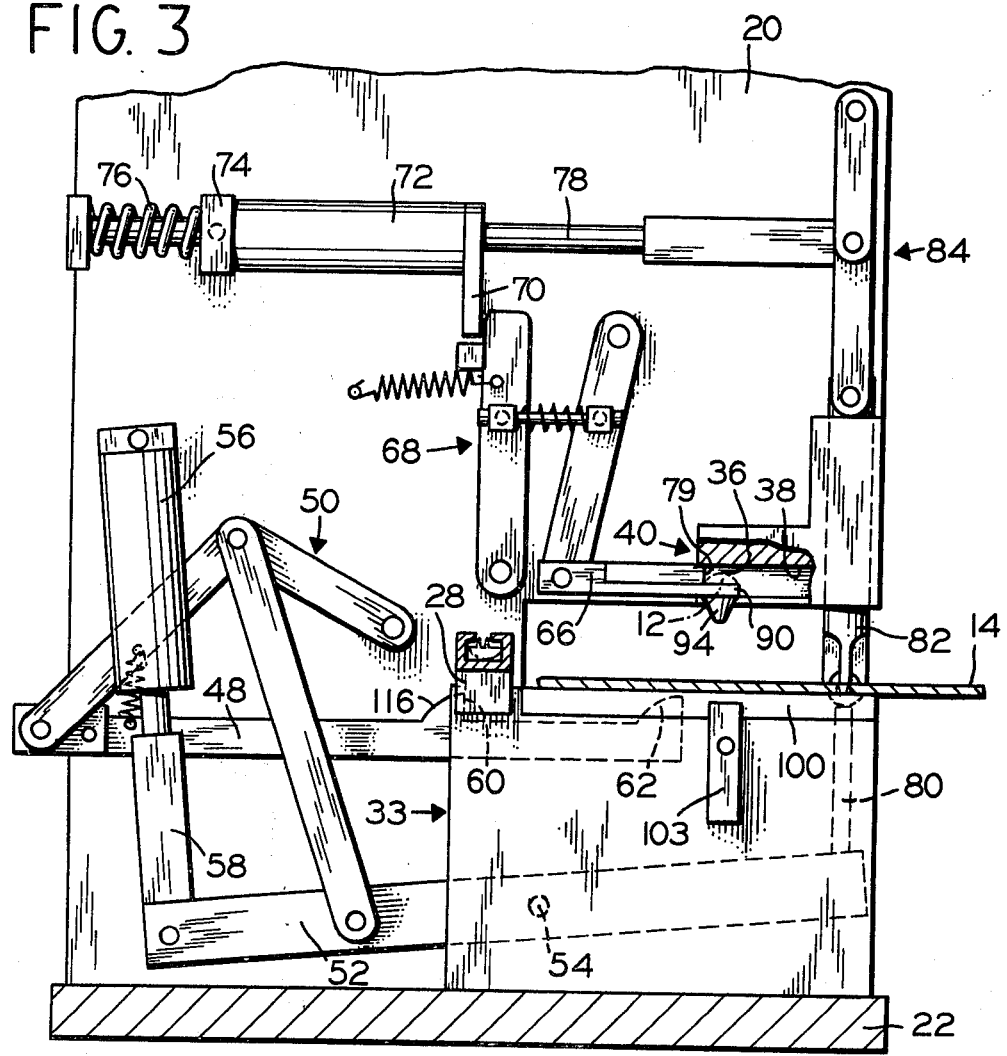
FIG. 3 is a view similar to FIG. 1 with a portion broken away therefrom illustrating a second operative position of the apparatus.

As shown in FIG. 3 the slide bar 66 has an extension 90 on the forward end thereof which extends beneath the element 12 in the slide path 38. A pointer or indicator, such as cone-shaped pointer or indicator 94 or the like, is mounted on the underside of the extension 90 such that the apex of the pointer 94 is aligned directly along a central axis of the elements 10 and 12 at the lower and upper stations 16 and 18 when the slide bar 66 is advanced as indicated in FIG. 1.

Figure 4:
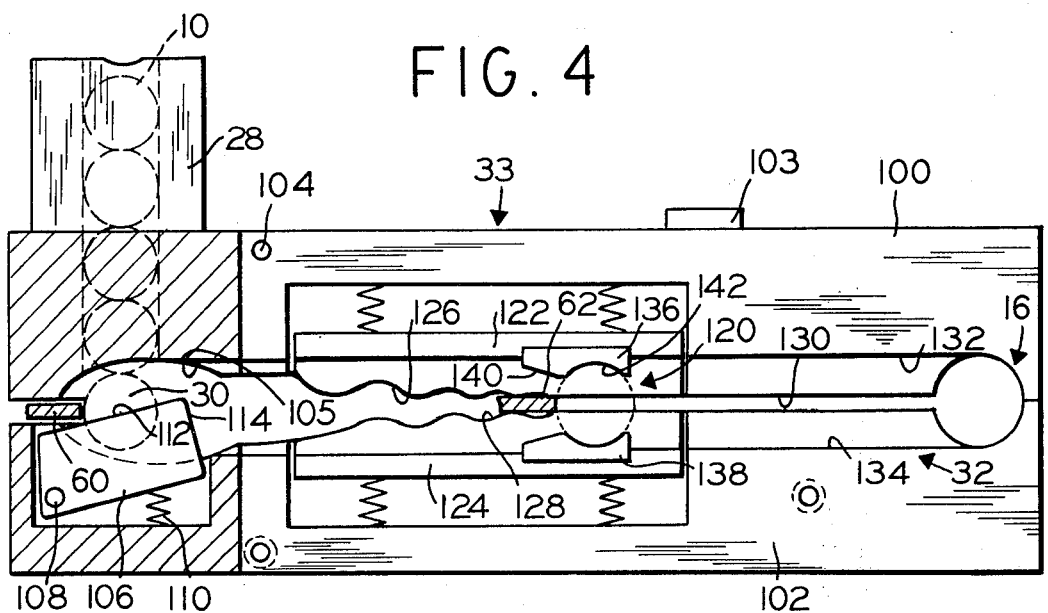
FIG. 4 is a bottom view taken along a slide path to a lower station of a portion of the apparatus of FIG. 1.

The lower assembly 33 has a pair of upper members 100 and 102 shown in FIG. 4, the member 100 being pivoted at point 104 while the member 102 is stationarily mounted in the assembly 33. A latch 103 pivotally mounted on the side of the assembly normally secures the member 100 in the closed position but can be pivoted to allow the member 100 to be pivoted open. A cavity 105 is formed at the rear end point 30 of the lower assembly 33 for receiving the heads of the fastener elements 10 from the chute 28 with the prongs 12 extending upward, i.e., away from the view in FIG. 4. A member 106 is pivotally mounted at 108 in the assembly 34 and has a spring 110 normally urging a side camming surface 112 of the member 106 into the path of the projection 60 such that the projection 60 cams the member 106 out of its path during its forward movement. The member 106 has a front cam surface 114 for engaging a rear camming surface 116, FIG. 3, of the projection 60 to pivot the slide bar 48 downward against an upward spring bias to allow the projections 60 and 62 to pass beneath the heads of elements 10 at the rear end position 30 and at an intermediate position indicated generally at 120. A pair of guide blocks 122 and 124 are resiliently mounted in the members 100 and 102 and have mating sinuous edges 126 and 128 forming a tortuous curved and tapered opening extending from the rear of the guide blocks 122 and 124 to the intermediate position 120. The sinuous edges 126 and 128 are formed in such a manner to orient the prongs 19 of elements 10 having dual prongs in alignment with a narrow slot 130 extending from the intermediate point 120 to the lower station 16. Suitable grooves 132 and 134 are formed throughout the length of the members 100 and 102 and the guide bars 122 and 124 to pass the heads of the elements 10.

At the intermediate point 120 of the slide path 32, a pair of detent members 136 and 138 are mounted on the underside of the respective guide bars 122 and 124 for extending partially into the respective grooves 132 and 134 forming the slide path for the heads of the elements 10. Each of the detent members 136 and 138 has a rear camming surface 140 for being engaged by the head of element 10 to push the resilient mounted guide bars 122 and 124 apart. Opposing reliefs 142 in the detent members 136 and 138 are formed such as to grip and retain the element 10 in the intermediate position when the projection 60 is withdrawn and the projection 62 is retracted back of the intermediate position.

Figure 5:
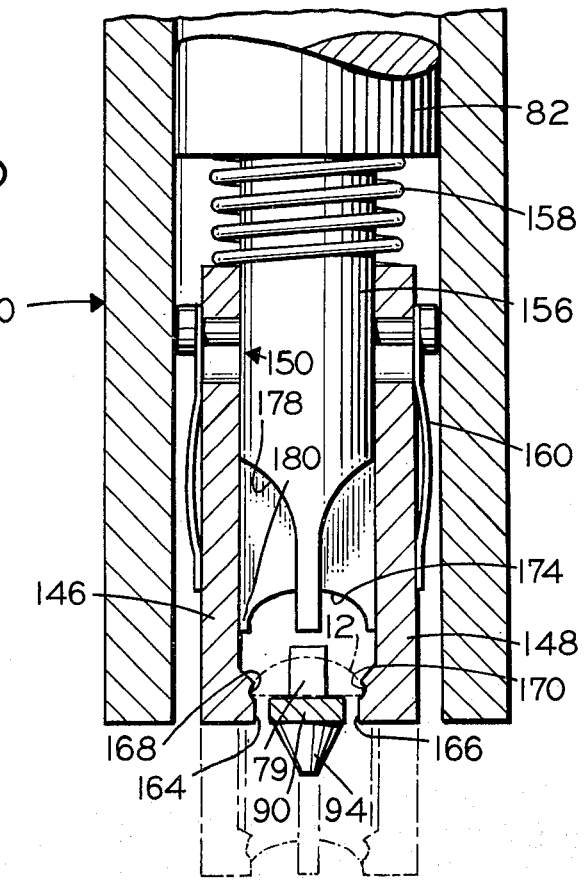
FIG. 5 is a front cross sectional view of an upper station and ram of the apparatus of FIG. 1.

As shown in FIG. 5 a pair of gripping members 146 and 148 are slidably secured to the lower portion 156 of the ram 82 such as by a pin and slot arrangement indicated generally at 150. Spring means 158 normally urges the members 146 and 148 downward. Springs 160 normally urge the members 146 and 148 toward each other against the lower portion 156 of the ram. Horizontally extending ribs 164 and 166 of the members 146 and 148 extend inwardly along the inside surfaces of the members 146 and 148 at the lower end thereof to define grooves or channels 168 and 170 for receiving and supporting outer edges of the element 12 as it is pushed therein by the forward abutment surface 79 of the pusher 66. The lower surfaces of the grooves 168 and 170 are formed such as to allow the element 12 to be pushed downward and to cam the members 146 and 148 further apart as illustrated in phantom.

The lower end of the ram portion 156 is cylindrical and has a domed cavity 174 formed therein for mating with the domed upper surface of elements 12 having such domed upper surfaces; the cavities for other types of elements having suitable forms conventional for such other types of elements. Reliefs 178 are formed around the lower end of the portion 156 such as to form quadrilaterally arranged extensions 180 which extend downward over the outside surface of the cavity 174 for extending on four sides of the element 12; of course the extensions 180 may vary in number (two, three, etc) in accordance with the particular requirements of specific fastener elements.

Figure 6:
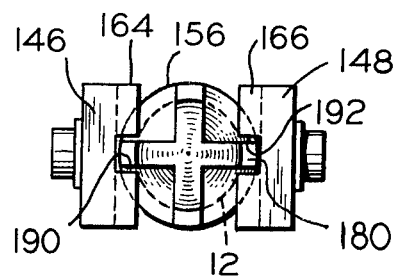
FIG. 6 is a bottom view of the upper station and ram of FIG. 5.

As shown in FIG. 6, the ribs 164 and 166 on the members 146 and 148 have respective slots 190 and 192 formed therein for accommodating two opposite extensions 180 of the lower ram portion 156 when the ram 82 is lowered.

In operation of the fastener attaching apparatus of FIG. 1, the actuation of the apparatus will force the elements 10 and 12 at the respective lower and upper stations 16 and 18 together causing the prongs 10 to penetrate through an article 14 positioned between the lower station 16 and the upper station 18 and into the element 12 where the prongs 19 are deformed to secure the elements 10 and 12 on the opposite sides of the article 14.

More particularly, the pointer 94 is utilized to align the article between the stations 16 and 18 to the precise position where the elements 10 and 12 are to be secured. When the article has been suitable positioned, the apparatus is suitably actuated which causes the air cylinders 56 and 72 to advance their respective piston rods 58 and 78 to first retract the slide rod bars 48 and 66, and then to lower the ram 82 and raise the ram 80. The piston rod 58 pivots the lever 52 which operates the lever mechanism 50 to retract the slide rod 48 and which raises the ram 80. During a first portion of the advancement of the piston rod 78 relative to the air cylinder 72, the spring 76 retracts the air cylinder 72 moving the projection 70 rearward to release the spring biased lever mechanism 68 which retracts the push rod 66. During the second portion of the advancement of the piston rod 78 the lever mechanism 84 is operated to lower the upper ram assembly 82. Thus, the elements 10 and 12 are attached to the article 14. After the attaching cycle, the air cylinders 56 and 72 are deactuated returning the rams 80 and 82 to their respective lowered and raised positions as well as advancing the slide bars 48 and 66 to push successive elements 10 and 12 to the respective lower and upper stations 16 and 18.

During the retraction of the push rod 48, the rear camming surface 116 of the projection 60 engages the forward camming edge 114 of the member 106 which pivots the slide bar 48 downward from the slide path 32 to pass the projections 60 and 62 beneath the elements 10 at the rear point 30 and the intermediate point 120. After passing beneath the elements 10 the slide bar 48 and projections are allowed to return under their spring bias into the slide path 32. The subsequent advancement of the slide bar 66 pushes the elements 10 at the rear point 30 and the intermediate point 120 to the intermediate point 120 and the station 16, respectively. At the intermediate point 120, the element 10 being pushed from the rear point 30 engages the camming surfaces 140 of the detent members 136 and 138 to spread the spring biased guide bars 122 and 124 thus allowing the element 10 to be gripped in the recesses 142 of the detent members 136 and 138 during the retraction of the slide bar 48.

As the ram 82 is lowered, the cavity 174 on the bottom edge of the lower portion 156 of the ram 82 engages the upper surface of the element 12. The extensions 180 surrounding the sides of the element 12 hold the element 12 in alignment with the element 10 and prevent the element 12 from shifting to any side. Also the cavity 174 and the extensions 180 tend to prevent any rotation of the elements 12 about any horizontal axis. As the ram 82 continues its downward movement, the lower ends of the members 146 and 148 engage the article 14 causing the ram 82 to move downward relative to the members 146 and 148. The ram 82 forces the element 12 downward to cam the ribs 164 and 166 and the members 146 and 148 apart to thus strip the element 12 from the members as it is engaged by the prongs 19 extending upward from the element 10.

It is particularly advantageous that the pointer 94, is vertically disposed over the article 14. Pointers which are disposed at an angle to avoid the movement of the ram 82 and the element 12, do not give a true center of location in articles of varying thicknesses; disposing the pointer 94 directly vertically over the article 14 avoids such problems.

It is further advantageous that the pointer 94 be directly mounted upon the slide bar 66 which advances the element 12 in position beneath the ram 82, and in the provision of suitable means for holding the slide bar 66 in the advanced position during the aligning of an article between the stations 16 and 18. Since the slide bar is automatically withdrawn during the cycling of the attachment of the elements 10 and 12, the pointer 94 is also withdrawn thus not interfering with operation of the ram 82.

Figure 7:
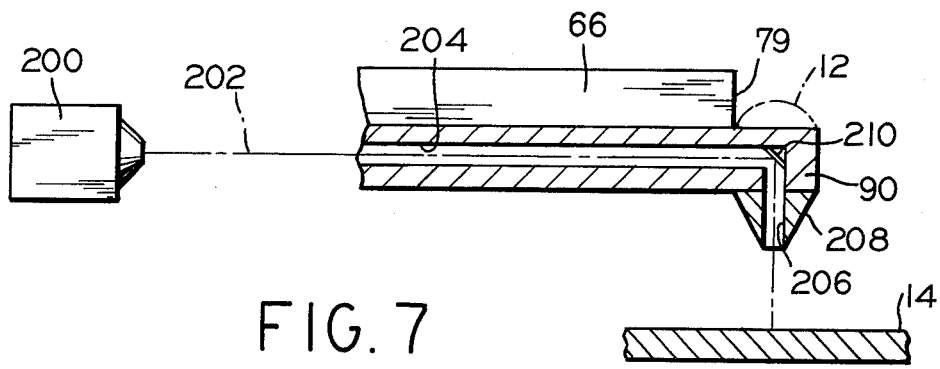
FIG. 7 is a side elevational view, partially in cross section, of a modified indicator suitable for substitution for the indicator of the apparatus in FIG. 1.

A modification of the pointer or indicator on the extension 90 of the slide bar 66 is shown in FIG. 7. The modified pointer or indicator includes a light beam source 200 suitably mounted on the support 20 for projecting a horizontal light beam 202. A horizontal passageway 204 formed within the slide bar 66 is aligned with the light beam projecting from the source 200. A vertical passageway 206, formed in a pointer element 208 mounted on the extension 90, extends in alignment with the elements 10 and 12 at the stations 16 and 18 when the slide bar 66 is advanced. A mirror or similar reflective device 210 is mounted at the intersection of the passageways 204 and 208 to reflect the light beam 202 downward at a 90° angle. The modification of FIG. 7 produces a light spot on the article 14 at the exact position where the elements 10 and 12 are to be attached.

Figure 8:
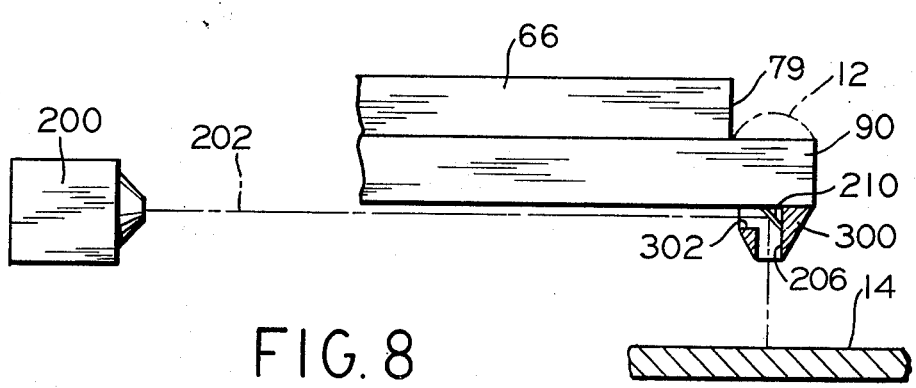
FIG. 8 is a side view, partially in cross section, of another modified indicator suitable for substitution in the apparatus of FIG. 1.

Referring to FIG. 8, there is shown a still further modified indicator or pointer 300. A horizontal passageway 302 is formed within the rear of the pointer 300 to intersect with the passageway 206 and allow light to be reflected downward by the reflector 210 at the intersection of the passages 302 and 206.

Since many modifications, changes in detail, and variations may be made to the presently described embodiments, it is intended that all matter in the foregoing description and the accompanying drawings be interpreted as illustrative and not in a limiting sense.

What is claimed is:

1. An apparatus for attaching first and second mating elements to articles wherein one of the first and second elements has a deformable prong extending therefrom for securing the one element through the article to the other of the first and second elements, said apparatus comprising a lower station for supporting a first element, an upper station vertically aligned with the lower station and spaced above the lower station for supporting a second element, ram means for forcing the first and second elements at the lower and upper stations toward each other, a first hopper and feeding means for containing a plurality of first elements and for feeding first elements sequentially to the lower station, means forming a slide path extending horizontally to the upper station, a second hopper and feeding means for containing a plurality of second elements and for feeding second elements sequentially to a point in the slide path spaced from the upper station, a slide bar mounted for sliding movement in the slide path, means for operating the ram means and the slide bar to assemble first and second elements on an article between the lower and upper stations and to advance the slide bar after operation of the ram means to push a second element down the slide path to the upper station, and an indicator including means mounted on the slide bar for movement therewith, said indicator means being in vertical alignment with the upper and lower stations when the slide bar is advanced.

2. An apparatus as claimed in claim 1 wherein the slide bar has an extension extending below the second element being pushed thereby, and the indicator means includes a cone-shaped member mounted at its base on the extension and having its apex extending downward.

3. An apparatus as claimed in claim 1 wherein the indicator includes means capable of producing a beam of light, and the indicator means includes means for directing the beam of light vertically downward from the upper station toward the lower station.

4. An apparatus as claimed in claim 3 wherein there is included a stationary support, the means capable of producing a beam of light is mounted on the stationary support and is spaced horizontally from the slide bar, and the means for directing the light beam downward includes means for deflecting the light beam downward.

5. An apparatus as claimed in claim 4 wherein the means for directing the light beam downward includes a horizontal passageway for receiving a beam of light from the source, a vertical passageway intersecting the horizontal passageway, and relective means at the intersection of the horizontal and vertical passageways for relecting the beam of light from the horizontal passageway to the vertical passageway.

6. An apparatus as claimed in claim 5 wherein the horizontal passageway extends through the length of the slide bar.

7. An apparatus for attaching first and second mating elements to articles wherein one of the first elements has a head and a deformable prong extending transverse to the head for securing the first element through the article to the second element, said apparatus comprising a lower station for supporting the first element, an upper station vertically aligned with the lower station and spaced above the lower station for supporting the second element, ram means for forcing the first and second elements at the lower and upper stations toward each other, means forming first and second slide paths extending horizontally to the respective lower and upper stations, first and second hopper means for containing respective pluralities of the first and second elements and for feeding the first and second elements sequentially to respective first and second points in the respective first and second slide paths, said first and second points being spaced from the respective lower and upper stations, first and second slide bars mounted for sliding movement in the respective first and second slide paths, means for operating the ram means and the first and second slide bars to assemble first and second elements on an article between the lower and upper stations and to advance the first and second slide bars after operation of the ram means to push the first and second elements down the first and second slide paths to the lower and upper stations, a pair of opposed guide bars on opposite sides of the first slide path, means for resiliently mounting the guide bars on the means forming the first slide path, said first slide bar having first and second spaced pushers for advancing a pair of the first elements in sequence down the first guide path, said operating means including means for reciprocating the first slide bar and means for retracting the first and second pushers from the first slide path during a backward movement of the first slide bar, and a pair of detent members mounted on the respective pair of guide bars for engaging and retaining the head of a first element in an intermediate point in the first slide path during backward movement of the first slide bar.

8. An apparatus as claimed in claim 7 wherein each of the detent members has a camming surface on the rearward edge thereof for engaging the head of a first element and camming the detent members apart, and an arcuate recess for engaging and retaining the head of the first element.

9. An apparatus for attaching first and second mating elements to articles wherein one of the first and second elements has a head and a deformable prong extending therefrom for securing the one element to the other of the first and second elements, said apparatus comprising
- a lower station for supporting a first element,
- an upper station vertically aligned with the lower station and spaced above the lower station for supporting a second element,
- ram means for forcing the first and second elements at the lower and upper stations toward each other,
- first and second hopper and feeding means for containing respective pluralities of the first and second elements and for feeding the first and second elements sequentially to the respective lower and upper stations,
- means for operating the ram means to assemble first and second elements on an article between the lower and upper stations,
- a pair of resilient members having opposed horizontal ribs extending into the upper station for receiving and supporting a second element with its face down, and
- said ram means including a cylindrical vertical upper ram having a cavity formed in the bottom thereof and having reliefs forming elongated vertical extensions disposed and extending vertically downward of the cavity for holding the head of the second element in alignment.

10. An apparatus as claimed in claim 9 wherein the pair of resilient members each have a vertical slot formed therein to accommodate a respective one of the elongated vertical extensions whereby said ram is capable of stripping the second element downward from the ribs of the resilient members and maintaining the alignment of the second element.

11. An apparatus as claimed in claim 9 wherein the cavity formed in the bottom of the upper ram is dome-shaped.

12. An apparatus as claimed in claim 9 wherein the reliefs in the ram means form at least four elongated vertical extensions disposed quadrilaterally and extending vertically downward on four sides fo the cavity for holding the head of the second element in alignment.

* * * * *